United States Patent [19]

Otaki

[11] Patent Number: 5,657,166
[45] Date of Patent: Aug. 12, 1997

[54] CONDENSER LENS SYSTEM FOR USE IN A MICROSCOPE

[75] Inventor: Tatsuro Otaki, Tokyo, Japan

[73] Assignee: Nikon Corporation, Tokyo, Japan

[21] Appl. No.: 178,847

[22] Filed: Jan. 7, 1994

[30] Foreign Application Priority Data

| Jan. 8, 1993 | [JP] | Japan | ................................ 5-001443 |
| Jan. 25, 1993 | [JP] | Japan | ................................ 5-009703 |
| Jan. 25, 1993 | [JP] | Japan | ................................ 5-009704 |

[51] Int. Cl.⁶ ............................. G02B 21/02; G02B 9/06
[52] U.S. Cl. ............................................ 359/661; 359/794
[58] Field of Search ................................ 359/389, 660, 359/661, 656, 657, 658, 659, 794

[56] References Cited

U.S. PATENT DOCUMENTS

| 2,305,760 | 12/1942 | Bernhardt | ................................ 359/661 |
| 2,764,061 | 9/1956 | Kinder et al. | ................................ 359/661 |
| 3,202,049 | 8/1965 | Bond | ................................ 359/660 |
| 3,297,393 | 1/1967 | Ziegler | ................................ 359/660 |
| 3,481,665 | 12/1969 | Rosenberger | ................................ 359/660 |
| 3,659,924 | 5/1972 | Shoemaker | ................................ 359/660 |
| 4,316,653 | 2/1982 | Shimizu | ................................ 350/465 |
| 5,004,307 | 4/1991 | Kino et al. | ................................ 359/356 |

FOREIGN PATENT DOCUMENTS

| 2910747 C2 | 8/1982 | Germany . |
| 61-10054 | 3/1986 | Japan . |

*Primary Examiner*—Georgia Y. Epps
*Assistant Examiner*—Jordan M. Schwartz

[57] ABSTRACT

A condenser lens system to collect light from a light source to illuminate a sample, which comprises in a named order from the light source side, a front group of positive refracting power having at least one lens and a rear group of positive refracting power having at least a positive lens for liquid immersion located closest to the sample, the positive lens for liquid immersion having a flat surface on the sample side.

18 Claims, 10 Drawing Sheets

1

CONDENSER LENS SYSTEM FOR USE IN A MICROSCOPE

BACKGROUND OF THE INVENTION

1. Field of the Invention

The present invention relates to a condenser lens system used in an illumination optical system for a microscope. More particularly, the invention relates to a condenser lens system used in illumination optical system for an inverted microscope.

2. Related Background Art

FIG. 11 is a drawing to show a schematic structure of an inverted microscope. The structure of the inverted microscope is first described briefly. Light from a light source 10 is collected and condensed through a collector lens 11 and a condenser lens 12 to illuminate a sample O cultured in a culture solution W in a laboratory dish S. The dish S is mounted on a stage 13 which is two-dimensionally movable. An objective lens 14 and a reflecting mirror $M_1$ focus light passing through the sample O in the dish S to form a spatial image $I_1$. Then the spatial image $I_1$ is relayed by a relay lens 15 and a reflecting mirror $M_2$ to form another spatial image $I_2$. After that, the light is guided through a path-bending prism P to an eyepiece 16, whereby the spatial image $I_2$ (image of sample O) is observed through the eyepiece 16, as enlarged.

The inverted microscope as shown in FIG. 11 is frequently used for observing a sample cultured in a culture solution W in a laboratory dish S. For such an observation, an illumination system for an inverted microscope employs as the condenser lens 12, for example, a condenser lens system LS as shown in FIG. 12, which has a long operational distance (distance between an illuminated surface and the condenser lens), which is disposed away from a liquid surface of the culture solution W, and through which the light from the illumination light source 10 illuminates the sample O in solution.

In case the sample O in the culture solution W is illuminated using the condenser lens system LS having a long operational distance as shown in FIG. 12, external vibration causes the liquid surface of the culture solution W to fret, which in turn causes illumination unevenness, resulting in greatly interfering with the observation of the sample O. Such a problem occurred frequently with the condenser lens system LS as shown in FIG. 12.

In particular, if the sample O in the culture solution W is observed using an inverted phase-contrast microscope or an inverted differential interference microscope, which detects a slight phase difference between rays passing through the sample O, a slight shake of the liquid surface of the culture solution W produces a phase difference at the liquid surface. This phase difference at the liquid surface becomes a great disturbance in the observation of the sample O in the culture solution W. This is a problem.

When manipulation is made to manipulate a sample in the culture solution W with a slender glass tube, the surface tension of the culture solution W raises the liquid surface in the contact portion between the slender glass tube and the liquid surface. This portion causes a phase difference, which makes the observation of the sample O through the inverted phase-contrast microscope or the inverted differential interference microscope very difficult during manipulation. This is also a problem.

Also, since the condenser lens system LS having a long operational distance as shown in FIG. 12 inevitably has a long focal length in order to assure the long operational distance, it is difficult to give a large numerical aperture to the condenser lens with respect to the optical design. In case the sample in the culture solution is observed using an objective lens with a high magnification and a large numerical aperture, the intrinsic performance of the objective lens with the large numerical aperture cannot be fully utilized.

SUMMARY OF THE INVENTION

It is, therefore, an object of the present invention to provide a condenser lens system which can always enable excellent microscopic observation of a sample in solution.

In an aspect of the present invention, which achieves the above object, a condenser lens system is arranged to collect light from a light source and to illuminate a sample, wherein the condenser lens comprises in the following order from the light source side a front group $G_F$ of positive refracting power having at least one lens and a rear group $G_R$ of positive refracting power at least having a positive lens $L_a$ for liquid immersion (wherein the liquid may be water) disposed closest to the sample and having a flat surface on the sample side.

This arrangement permits the sample in solution to be illuminated in the state that the lens surface closest to the sample in the condenser lens system is located closer to the sample than the liquid surface. No illumination unevenness will be caused due to shake of the liquid surface in such an arrangement.

Further, in case the condenser lens system according to the present invention is employed for an inverted phase-contrast microscope or an inverted differential interference microscope, no problem will be caused by a phase difference resulting from a shake of the liquid surface or by a phase difference due to manipulation.

It is preferable in the condenser lens system that the positive lens $L_a$ for liquid immersion is arranged so as to project from a lens barrel holding the positive lens $L_a$. This arrangement reduces a possibility that the solution is contaminated by an adhesive for adhering the positive lens $L_a$ to the lens barrel.

In the condenser lens system constructed as described above, the projecting portion of the positive lens $L_a$ may have a taper portion, which advantageously facilitates the operation of manipulation while the sample through the microscope is observed.

In an aspect of the present invention, a condenser lens system is preferably arranged such that the positive lens $L_a$ for liquid immersion is interchangeable with a positive lens $L_b$ for oil immersion with a convex surface on the light source side. This arrangement requires no exclusive condenser lens system for oil immersion, and permits the sample to be observed at a higher observation magnification.

The above condenser lens system is preferably arranged to satisfy the following conditions:

(1) $0.4 < f_{Lb}/f_F < f_{La}/f_F < 0.7$ (2) $0.6 < NA_a/NA_b < 1$ where $f_F$ is a focal length of the front group $G_F$, $f_{La}$ a focal length of the positive lens $L_a$ for liquid immersion, $f_{Lb}$ a focal length of the second lens $L_b$, $NA_a$ a numerical aperture of the condenser lens system when the positive lens $L_a$ for liquid immersion is set in the condenser lens system, and $NA_b$ a numerical aperture of the condenser lens system when the second lens $L_b$ is set in the condenser lens system.

This arrangement permits the sample to be well illuminated under a large numerical aperture in either setting of the condenser lens system for liquid immersion or for oil immersion, fully drawing out the performance of the objective lens.

The condition (1) is for the arrangement in which when either the first lens $L_a$ for liquid immersion or the second lens $L_b$ for oil immersion is set in the rear group in the condenser lens, the aberration of the condenser lens is well compensated in each setting state, the front (light-source-side) focus position of the condenser lens is kept unchanged outside the condenser lens, and the rear (sample-side) focus position thereof is also kept outside the condenser lens.

First, in the condition (1), the relation of $0.4 < f_{Lb}/f_F$ is the optimum condition for such an arrangement that the spherical aberration and the coma are well compensated by the light-source-side surface of the second lens $L_b$ for oil immersion and that the front (light-source-side) focus position of the condenser lens is set in a space outside the condenser lens. Beyond the limits of $0.4 < f_{Lb}/f_F$, the front (light-source-side) focus position of the condenser lens comes to be located inside the condenser lens, whereby a sufficient space cannot be assured for a ring stop or an aperture stop for a phase-contrast microscope.

In the condition (1), the relation of $f_{La}/f_F < 0.7$ is the optimum condition for an arrangement such that the spherical aberration and the coma are well compensated by the light-source-side surface of the first lens $L_a$ for liquid immersion and that the rear (sample-side) focus position of the condenser lens is set in a space outside the condenser lens. Beyond the limits of $f_{La}/f_F < 0.7$, the rear (sample-side) focus position of the condenser lens comes to be located inside the condenser lens, which does not allow the condenser lens to function as such. If the rear (sample-side) focus position of the condenser lens is forced to be set outside the condenser lens in that case, the spherical aberration and the coma cannot be compensated and the condenser lens cannot have a large numerical aperture.

In the condition (1), the relation of $f_{Lb}/f_F < f_{La}/f_F$ defines a relation of relative focal length between the first lens $L_a$ for liquid immersion and the second lens $L_b$ for oil immersion. Unless the relation of $f_{Lb}/f_F < f_{La}/f_F$ is satisfied, even if the condenser lens is arranged to compensate well for the various aberrations with the front group being common to the first and second lenses, the front (light-source-side) focus position of the condenser lens cannot be common to the two lenses. Specifically, if a stop is set at the front (light-source-side) focus position of the condenser lens and when each lens is set in the rear group $G_R$, a mechanism is necessary for moving the position of the stop, which undesirably makes the structure complex.

Next, the condition (2) defines the optimum ratio of a numerical aperture between the first lens $L_a$ for liquid immersion and the second lens $L_b$ for oil immersion.

Below the lower limit of condition (2), the numerical aperture of the condenser lens is too small when the first lens $L_a$ for liquid immersion is set, which does not allow the sample to be illuminated under a large numerical aperture. Then, if a sample is observed through a (high-magnification) objective lens with a large numerical aperture, the performance of the objective lens cannot be fully drawn out.

Conversely, above the upper limit of condition (2), the numerical aperture of the condenser lens is too small when the second lens $L_b$ for oil immersion is set, which does not allow the sample to be illuminated under a larger numerical aperture. Then, if a sample is observed through a (higher-magnification) objective lens with a larger numerical aperture, the performance of the objective lens cannot be fully drawn out.

Further, the following condition (3) is preferably satisfied in addition to the above conditions (1) and (2).

(3) $0 < D_b/D_a < 0.4$ where $D_a$: an axial distance between the lens surface closest to the sample in the front group $G_F$ and the lens surface closest to the light source in the first lens $L_a$ for liquid immersion in the condenser lens;

$D_b$: an axial distance between the lens surface closest to the sample in the front group $G_F$ and the lens surface closest to the light source in the second lens $L_b$ for oil immersion in the condenser lens.

Below the lower limit of condition (3), when the second lens $L_b$ for oil immersion is set in the rear group $G_R$ in the condenser lens, the lenses mechanically interfere with each other. Conversely, above the upper limit of condition (3), although, with the front group $G_F$ being common to the first and second lenses, the various aberrations of the condenser lens can be well compensated when the first lens $L_a$ for liquid immersion is set, the front (light-source-side) focus position of the condenser lens cannot be made common to the two lenses.

In another aspect of the present invention, a condenser lens system is preferably arranged to satisfy the following conditions:

(4) $0.4 < d_{La}/f < 1$ (5) $0.22 < d_{La}/L < 0.6$ (6) $0.1 < d_W/f < 0.7$ (7) $0.6 < f_{La}/f_F < 1$ where f is a focal length of the total condenser lens system, $d_{La}$ an axial thickness of the positive lens $L_a$ for liquid immersion, L an axial distance between the lens surface closest to the light source in the front group and the lens surface closest to the sample in the rear group, $d_W$ a distance between the positive lens for liquid immersion and the sample surface, $f_{La}$ a focal length of the positive lens for liquid immersion, and $f_F$ a focal length of the front group $G_F$.

This arrangement can provide a condenser lens system for liquid immersion having a satisfactory performance.

The condition (4) and the condition (5) define the optimum structure of the lens which is located closest to the sample in the condenser lens for liquid immersion and at least a part of which is immersed in a solution.

If the focal length of the condenser lens comes to be too long below the lower limit of condition (4), the condenser lens itself must be increased in size to obtain a large numerical aperture, which is against the size reduction. In addition, the positive lens $L_R$ located closest to the sample surface would have a too thin axial thickness, so that it becomes difficult to immerse a part of the positive lens $L_R$ in a solution in which the sample is set. Conversely, above the upper limit of condition (4), the condenser lens should have a too short focal length, which results in failing to assure a sufficient operational distance and making difficult the observation of the sample under an operation such as a manipulation. Further, in case the focal length of the condenser lens is extremely short relative to the axial thickness of the positive lens $L_a$, the aberration compensation of the total condenser lens, specifically the compensation of spherical aberration, becomes difficult.

Below the lower limit of condition (5), it becomes difficult to immerse a part of the positive lens $L_a$ in solution in which the sample is set and the total length of condenser lens becomes longer, against the desire of size reduction. Conversely, above the upper limit of condition (5), the axial thickness of positive lens $L_a$ becomes extremely thick relative to the total length of condenser lens, which makes difficult the aberration compensation of the total condenser lens, specifically the compensation of spherical aberration, similarly as in the case of above the upper limit of condition (4).

The condition (6) is for obtaining a suitable operational distance while assuring a sufficient numerical aperture of the condenser lens.

In case the operational distance becomes shorter below the lower limit of condition (6), it becomes difficult to observe a sample while carrying out an operation such as a manipulation. In case the focal length of the condenser lens becomes longer, the size of the condenser lens increases, which is not preferable. Conversely, above the upper limit of condition (6), the operational distance becomes greater relative to the focal length of condenser lens, resulting in failing to obtain a satisfactorily large numerical aperture in relation with the aberration compensation.

The condition (7) defines an optimum balance of refracting power for the positive lens $L_a$ located closest to the sample surface with respect to the front group.

Below the lower limit of condition (7), the front group becomes greater and the operational distance becomes shorter, which is not preferable. In other words, the aberration compensation cannot be effected in a compact arrangement while keeping a desired operational distance. Conversely, above the upper limit of condition (7), the compensation becomes very difficult for spherical aberration and for the sine condition while assuring a desired numerical aperture.

Further, the following condition (8) is preferably satisfied to achieve better aberration compensation:

(8) $n_a < 1.5$ where $n_a$ is an index of refraction of an optical material for the surface closest to the sample in the positive lens $L_a$ located closest to the sample in the condenser lens.

Unless the relation of condition (8) is satisfied, a large spherical aberration is caused by the solution and the glass surface contacting the solution, which results in forcing a great load of compensation for spherical aberration on the front group. Then, the excellent performance cannot be fully drawn out.

In another aspect of the present invention, a condenser lens system is arranged to collect light from a light source and to illuminate a sample, wherein the condenser lens system comprises a single lens or a plurality of lenses, and a lens barrel for holding the lens (lenses), wherein the lens barrel holds the lens (lenses) such that a sample-side surface of a lens element located closest to the sample projects from the tip end of the lens barrel.

This arrangement permits the sample in solution to be illuminated in the state that the lens surface closest to the sample in the condenser lens system is located closer to the sample than the liquid surface. Then, a shake of the liquid surface will not cause illumination unevenness. If the condenser lens system according to the present invention is employed for an inverted phase-contrast microscope or an inverted differential interference microscope, no problem would be caused by a phase difference due to the shake of the liquid surface or by a phase difference due to a manipulation. Further, since the lens is arranged to project from the lens barrel, the lens barrel is kept out of contact with the solution, which reduces a possibility that an adhesive for adhering the positive lens $L_a$ to the lens barrel contaminates the solution.

In another aspect of the present invention, a microscopic apparatus comprises a light source and a condenser lens system for collecting light from the light source to illuminate a sample, in which the condenser lens system comprises, in the following order from the light source side, a front group $G_F$ of positive refracting power having at least one lens and a rear group $G_R$ of positive refracting power at least having a positive lens $L_a$ for liquid immersion located closest to the sample and having a flat surface on the sample side.

This arrangement permits a sample in solution to be illuminated in the state that the lens surface closest to the sample in the condenser lens system is located closer to the sample than the liquid surface is. Then, a shake of the liquid surface will not cause illumination unevenness. Further, since no problem is caused by a phase difference due to a shake of the liquid surface or by a phase difference due to a manipulation, the microscopic apparatus according to the present invention is suitable for a differential interference microscope or a phase-contrast microscope.

Other objects, features and effects of the present invention will be apparent from the detailed description as will be apparent from the detailed description as will be described with reference to the accompanying drawings.

DESCRIPTION OF THE PREFERRED EMBODIMENTS

Embodiments of the present invention will be described in detail with reference to the accompanying drawings.

Figure 1:
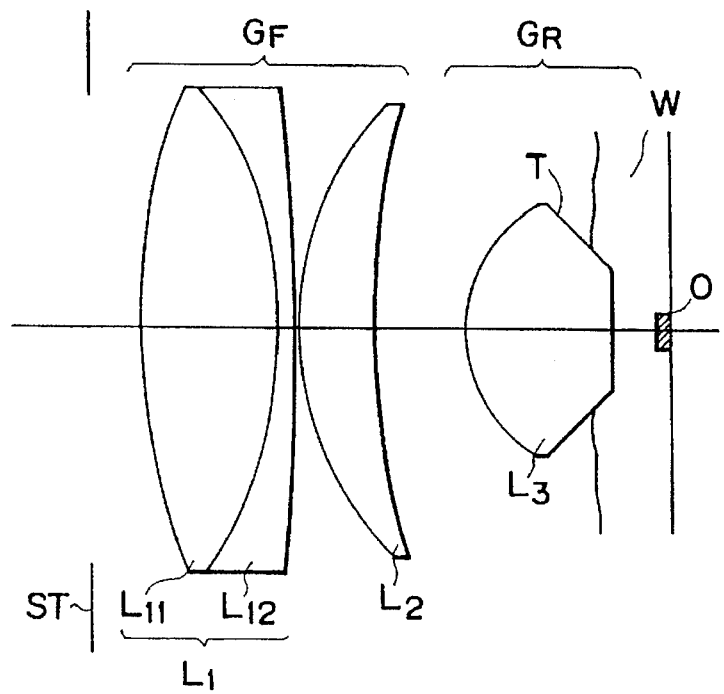
FIG. 1 is a drawing to show a lens arrangement for the first embodiment of a condenser lens for liquid immersion according to the present invention.
Figure 2:
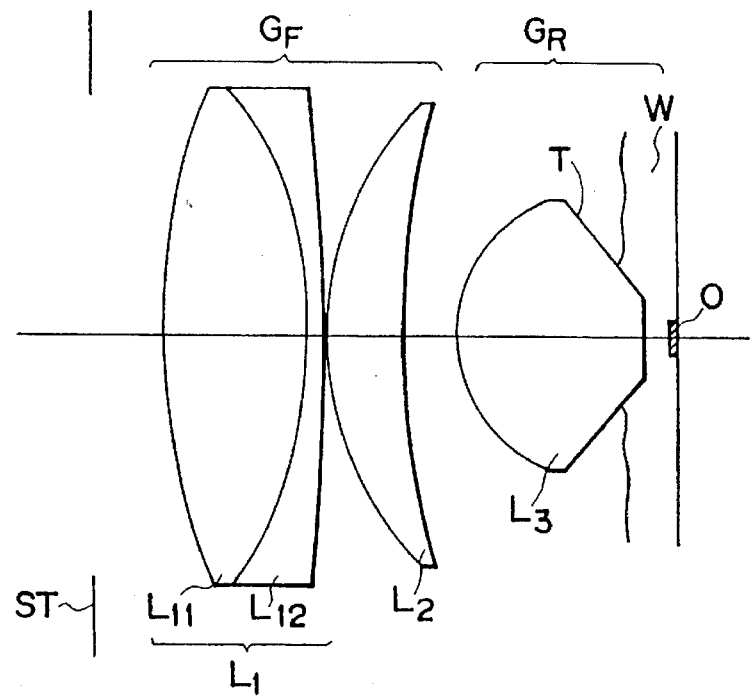
FIG. 2 is a drawing to show a lens arrangement for the second embodiment of the condenser lens for liquid immersion according to the present invention.
Figure 3:
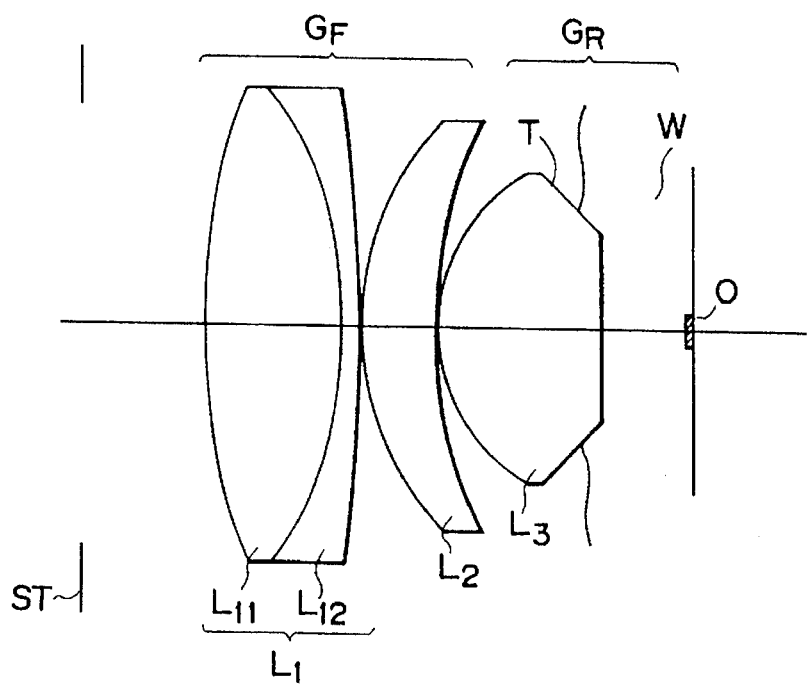
FIG. 3 is a drawing to show a lens arrangement for the third embodiment of the condenser lens for liquid immersion according to the present invention.

FIG. 1 to FIG. 3 are drawings respectively showing the structure of a condenser lens in the first, the second and the third embodiments according to the present invention. In the drawings, ST represents an aperture stop.

As shown in FIG. 1 to FIG. 3, a liquid immersion (wherein the liquid may be water) condenser lens in each of the first to third embodiments basically comprises two lens groups, which are a front group $G_F$ of positive refracting power and a rear group $G_R$ of positive refracting power.

First, the front group $G_F$ comprises, in the following order from the light source side, a positive compound lens $L_1$ including a positive double convex lens $L_{11}$ and a negative meniscus lens $L_{12}$ bonded to the positive lens $L_{11}$ and having a convex surface on the sample side, and a positive meniscus lens $L_2$ with a convex surface on the light source side. The rear group $G_R$ comprises a plano-convex lens $L_3$ with a convex surface on the light source side. In the plano-convex lens $L_3$, the convex lens surface on the light source side is aplanatic and the sample-side surface is a surface for liquid immersion which is to be immersed in the solution W.

In each of the first to third embodiments, the sample-side surface of the plano-convex lens $L_3$ is made of quartz glass from which no undesirable elements will dissolve into the solution W when immersed therein.

Figure 5:
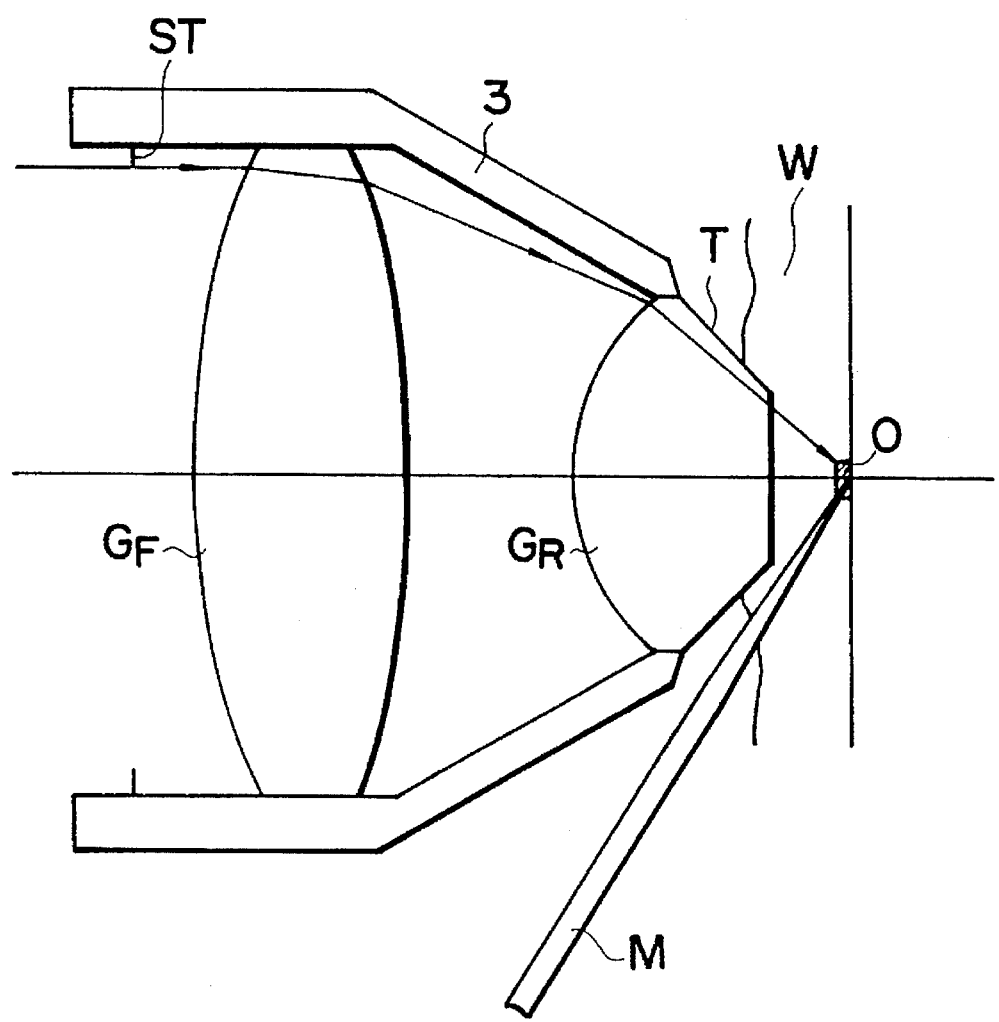
FIG. 5 is a schematic drawing to show a state that a manipulation operation is carried out using the condenser lens for liquid immersion.

In each of the first to third embodiments, the condenser lens is so arranged that the plano-convex lens $L_3$ has a taper portion T formed in the peripheral portion thereof as shown in FIG. 1 to FIG. 3 in order to facilitate the operation such as a manipulation for manipulating a sample in the culture solution W by a slender glass tube M or the like, as shown in FIG. 5. If the condenser lens in each of the first to third embodiments is held by a lens barrel, it is preferable that the tip end of the lens barrel is kept from being immersed directly in the solution. Therefore, the taper portion T is preferably held so as to project from the lens barrel 3, for example, as shown in FIG. 5.

Table 1 to Table 3 as given below list specifications for the first to third embodiments, respectively, in the present invention. In Table 1 to Table 3, $r_i$ represents a radius of curvature, $d_i$ a distance between lens surfaces, $v_i$ an Abbe's number, $n_i$ an index of refraction for d line ($\lambda=587$ nm), and subscript i an order counted from the light source side. Further, in each table, $d_O$ represents a distance between the aperture stop ST and the first lens surface, $n_w$ an index of refraction of water, $v_w$ an Abbe's number of water, f a focal length of the total condenser lens system, $f_F$ a focal length of the front group $G_F$, in the condenser lens, NA a numerical aperture on the sample side of the condenser lens, L an axial distance between the lens surface closest to the light source and the lens surface closest to the sample in the condenser lens (the total length of condenser), $d_{La}$ an axial thickness of the positive lens $L_3$ located nearest to the sample in the condenser lens, $f_{La}$ a focal length of the positive lens $L_3$ located closest to the sample in the condenser lens, $d_W$ a distance (operational distance) between the sample surface and the positive lens $L_3$ located closest to the sample in the condenser lens, and $n_a$ an index of refraction of an optical material forming the sample-side surface of the positive lens $L_3$.

TABLE 1

First Embodiment (f = 15.0, NA = 0.9, $f_F$ = 27.8, $f_{LR}$ = 19.0, $d_O$ = 3.2)

| | | | | |
|---|---|---|---|---|
| $r_1$ = 39.31 | $d_1$ = 8.30 | $n_1$ = 1.59319 | $v_1$ = 67.9 | ($L_{11}$) |
| $r_2$ = −26.23 | $d_2$ = 1.00 | $n_2$ = 1.86074 | $v_2$ = 23.0 | ($L_{12}$) |
| $r_3$ = −141.00 | $d_3$ = 0.10 | | | |
| $r_4$ = 19.30 | $d_4$ = 4.70 | $n_3$ = 1.77279 | $v_3$ = 49.5 | ($L_2$) |
| $r_5$ = 50.50 | $d_5$ = 5.70 | | | |
| $r_6$ = 8.73 | $d_6$ = 8.80 | $n_4$ = 1.45847 | $v_4$ = 67.7 | ($L_3$) |
| $r_7$ = ∞ | $d_W$ = 3.65 | $n_W$ = 1.33306 | $v_W$ = 54.0 | (water) |

$d_{La}/f$ = 0.587, $d_{La}/L$ = 0.308, $d_W/f$ = 0.243, $f_{La}/f_F$ = 0.683, $n_a$ = 1.45847.

TABLE 2

Second Embodiment (f = 13.6, NA = 1.0, $f_F$ = 27.8, $f_{LR}$ = 18.2, $d_O$ = 4.3)

| | | | | |
|---|---|---|---|---|
| $r_1$ = 39.31 | $d_1$ = 8.30 | $n_1$ = 1.59319 | $v_1$ = 67.9 | ($L_{11}$) |
| $r_2$ = −26.23 | $d_2$ = 1.00 | $n_2$ = 1.86074 | $v_2$ = 23.0 | ($L_{12}$) |
| $r_3$ = −141.00 | $d_3$ = 0.10 | | | |
| $r_4$ = 19.30 | $d_4$ = 4.70 | $n_3$ = 1.77279 | $v_3$ = 49.5 | ($L_2$) |
| $r_5$ = 50.50 | $d_5$ = 3.00 | | | |
| $r_6$ = 8.32 | $d_6$ = 11.50 | $n_4$ = 1.45847 | $v_4$ = 67.7 | ($L_3$) |
| $r_7$ = ∞ | $d_W$ = 1.85 | $n_W$ = 1.33306 | $v_W$ = 54.0 | (water) |

$d_{La}/f$ = 0.846, $d_{La}/L$ = 0.402, $d_W/f$ = 0.136, $f_{La}/f_F$ = 0.655, $n_a$ = 1.45847.

TABLE 3

Third Embodiment (f = 15.0, NA = 0.9, $f_F$ = 28.2, $f_{LR}$ = 24.0, $d_O$ = 9.3)

| | | | | |
|---|---|---|---|---|
| $r_1$ = 34.00 | $d_1$ = 8.30 | $n_1$ = 1.59319 | $v_1$ = 67.9 | ($L_{11}$) |
| $r_2$ = −26.90 | $d_2$ = 1.00 | $n_2$ = 1.86074 | $v_2$ = 23.0 | ($L_{12}$) |
| $r_3$ = −112.00 | $d_3$ = 0.10 | | | |
| $r_4$ = 17.19 | $d_4$ = 4.70 | $n_3$ = 1.77279 | $v_3$ = 49.5 | ($L_2$) |
| $r_5$ = 28.53 | $d_5$ = 0.20 | | | |
| $r_6$ = 11.00 | $d_6$ = 10.00 | $n_4$ = 1.45847 | $v_4$ = 67.7 | ($L_3$) |
| $r_7$ = ∞ | $d_7$ = 5.80 | $n_W$ = 1.33306 | $v_W$ = 54.0 | (water) |

$d_{La}/f$ = 0.667, $d_{La}/L$ = 0.412, $d_W/f$ = 0.388, $f_{La}/f_F$ = 0.851, $n_a$ = 1.45847.

Figure 4:
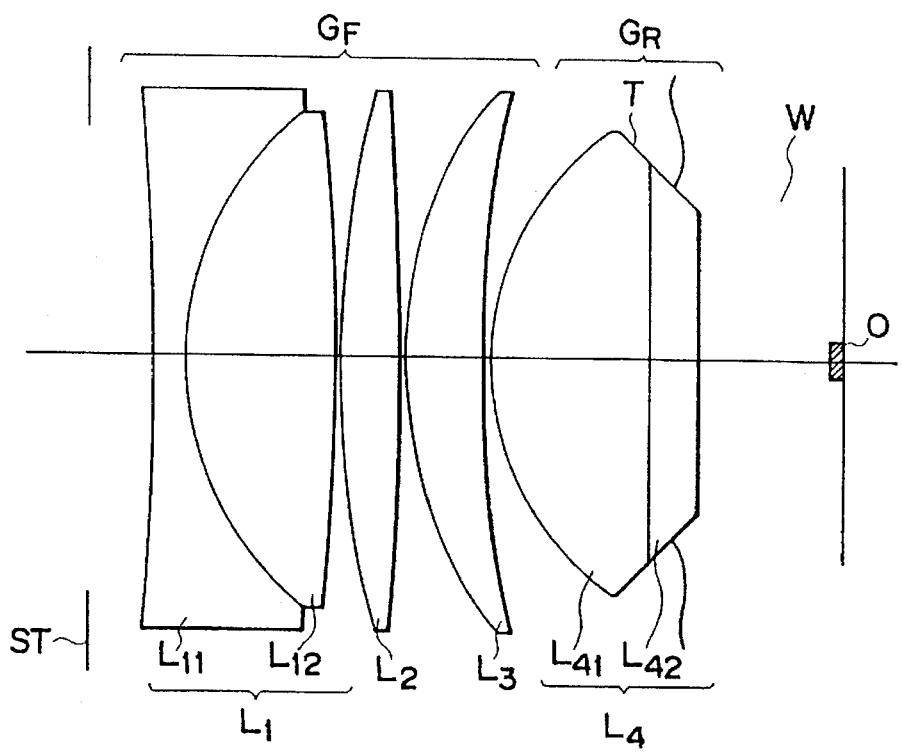
FIG. 4 is a drawing to show a lens arrangement for the fourth embodiment of the condenser lens for liquid immersion according to the present invention.

The fourth embodiment according to the present invention is next described referring to FIG. 4. As shown in FIG. 4, a condenser lens for liquid immersion in the present embodiment also comprises basically two lens groups, which are a front group $G_F$ of positive refracting power and a rear group $G_R$ of positive refracting power, as in the first to third embodiments shown in FIG. 1 to FIG. 3. The front group $G_F$ comprises, in the following order from the light source side, a negative compound lens $L_1$ including a negative double concave lens $L_{11}$ with a stronger-curvature surface on the sample side and a positive lens $L_{12}$ bonded to the negative lens $L_{11}$ and having a stronger-curvature surface on the light source side, a positive double convex lens $L_2$ and a positive meniscus lens $L_3$ with a convex surface on the light source side. The rear group $G_R$ comprises a positive compound lens $L_4$ including a plano-convex lens $L_{41}$ with a convex surface on the light source side and a plane-parallel plate $L_{42}$ bonded thereto. In the present embodiment, the plane-parallel plate $L_{42}$ is made of quartz glass from which no undesirable elements will dissolve into the solution W when immersed therein. Although the present embodiment is so arranged that the bonded surfaces between the plano-convex lens $L_{41}$ and the plane-parallel plate $L_{42}$ are flat, such an alternative arrangement is possible that the sample-side surface of the plano-convex lens $L_{41}$ and the light-source-side surface of plane-parallel plate $L_{42}$ both are formed with a curvature (lens effect) and bonded to each other.

In the fourth embodiment, the condenser lens is so arranged that a part of the plano-convex lens $L_3$ and a peripheral portion of plane-parallel plate $L_{42}$ are shaped into a taper portion T in order to facilitate the operation such as a manipulation to manipulate a sample in the culture solution W by a slender glass tube M, as shown in FIG. 4 and 5. In case the condenser lens in the fourth embodiment is held by a lens barrel, it is preferable that the tip end of the lens barrel is kept from being immersed directly in the solution. For example, as shown in FIG. 5, the taper portion T is preferably so held as to project from the lens barrel 3.

As shown in FIG. 4, an aperture stop ST is provided on the light source side of the liquid immersion condenser lens in the fourth embodiment.

Table 4, as given below, lists specifications for the fourth embodiment in the present invention. In Table 4, $r_i$ represents a radius of curvature, $d_i$ a distance between lens surfaces, $v_i$ an Abbe's number, $n_i$ an index of refraction for d line ($\lambda$=587 nm), and subscript i an order from the light source side. Further, in the table, $d_0$ represents a distance between the aperture stop ST and the first lens surface, $n_w$ an index of refraction of water, $v_w$ an Abbe's number of water, f a focal length of the total condenser lens system, $f_F$ a focal length of the front group $G_F$ in the condenser lens, NA a numerical aperture on the sample side of condenser lens, L an axial distance between the lens surface closest to the light source and the lens surface closest to the sample in the condenser lens (the total length of the condenser), $d_{L4}$ an axial thickness of the positive lens $L_4$ ($L_{41}$, $L_{42}$) located closest to the sample in the condenser lens, $f_{L4}$ a focal length of the positive lens $L_4$ ($L_{41}$, $L_{42}$) located closest to the sample in the condenser lens, $d_W$ a distance (operational distance) between the sample surface and the positive lens $L_4$ ($L_{41}$, $L_{42}$) located closest to the sample in the condenser lens, and $n_a$ an index of refraction of an optical material (plane-parallel plate $L_{42}$) forming the surface closest to the sample in the positive lens $L_4$ ($L_{41}$, $L_{42}$).

TABLE 4

Fourth Embodiment (f = 15.0, NA = 0.9, $f_F$ = 36.5, $f_{LR}$ = 25.1, $d_0$ = 4.0)

| | | | | |
|---|---|---|---|---|
| $r_1$ = −200.00 | $d_1$ = 2.00 | $n_1$ = 1.80458 | $v_1$ = 25.5 | ($L_{11}$) |
| $r_2$ = 19.40 | $d_2$ = 9.20 | $n_2$ = 1.56883 | $v_2$ = 56.1 | ($L_{12}$) |
| $r_3$ = 163.70 | $d_3$ = 0.20 | | | |
| $r_4$ = 61.50 | $d_4$ = 4.00 | $n_3$ = 1.78797 | $v_3$ = 47.5 | ($L_2$) |
| $r_5$ = −245.00 | $d_5$ = 0.20 | | | |
| $r_6$ = 26.55 | $d_6$ = 5.00 | $n_4$ = 1.78797 | $v_4$ = 47.5 | ($L_3$) |
| $r_7$ = 75.30 | $d_7$ = 0.20 | | | |
| $r_8$ = 16.85 | $d_8$ = 10.00 | $n_5$ = 1.67025 | $v_5$ = 57.5 | ($L_{41}$) |
| $r_9$ = ∞ | $d_9$ = 3.00 | $n_6$ = 1.45847 | $v_6$ = 67.7 | ($L_{42}$) |
| $r_{10}$ = ∞ | $d_W$ = 9.00 | $n_W$ = 1.33306 | $v_W$ = 54.0 | (water) |

$d_{L4}/f$ = 0.867, $d_{L4}/L$ = 0.385, $d_W/f$ = 0.600,
$f_{L4}/f_F$ = 0.688, $n_a$ = 1.45847.

It is preferable in each embodiment according to the present invention that the taper portion T is formed at an angle (angle to the optical axis) greater than an angle between the optical axis and a ray passing through the outermost edge of the final surface (sample-side surface) of the plano-convex lens $L_4$ in the rear group $G_R$. Specifically, the angle is preferably 45 degrees in the first embodiment shown in FIG. 1, 50 degrees in the second embodiment shown in FIG. 2, 45 degrees in the third embodiment shown in FIG. 3, and 45 degrees in the fourth embodiment shown in FIG. 4.

Figure 11:
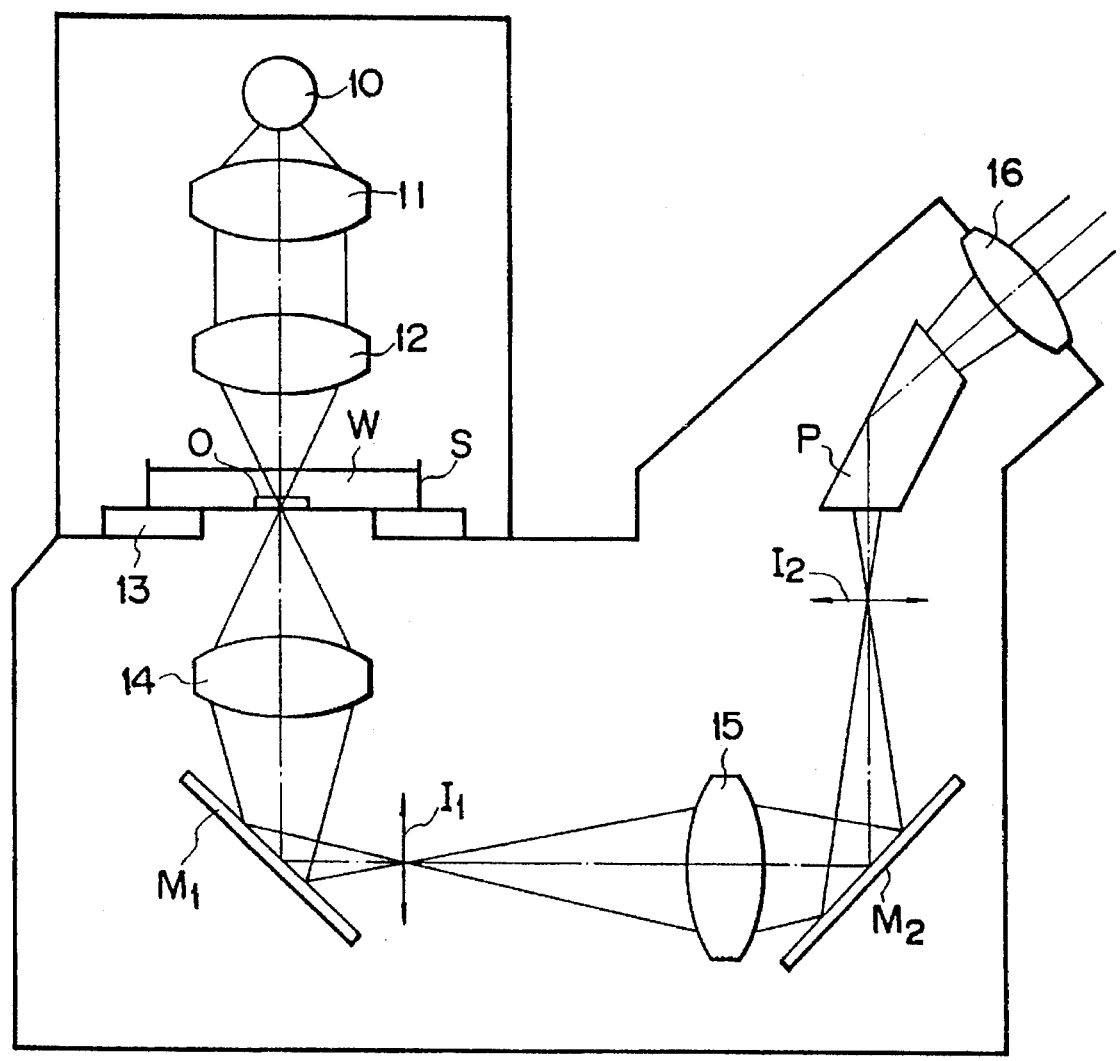
FIG. 11 is a drawing to show the structure of an inverted microscope.
Figure 12:
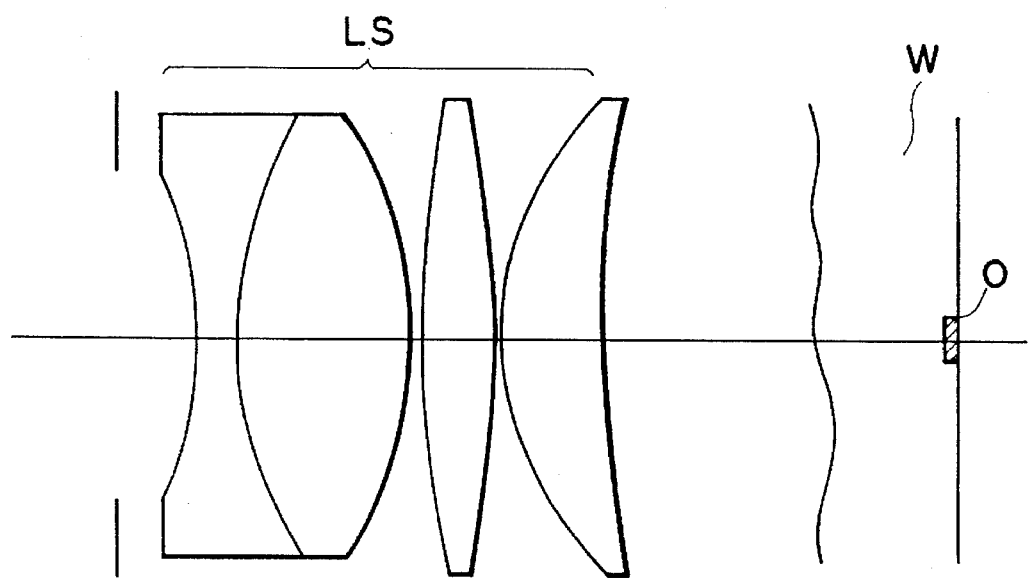
FIG. 12 is a drawing to show the structure of a conventional condenser lens.

As described above, the first to fourth embodiments according to the present invention can achieve the condenser lenses for liquid immersion having extremely excellent performance while assuring a large numerical aperture. As so arranged, the lens closest to the sample in each condenser lens can be immersed in solution, so that no illumination unevenness may be caused by a shake of the liquid surface. In addition, the embodiments have an advantage that there is no problem caused by a phase difference due to the shake of the liquid surface or by a phase difference due to manipulation. Therefore, the condenser lens systems in the first to fourth embodiments according to the present invention are suitable for applications as a condenser lens in an illumination system for an inverted microscope as shown in FIG. 11, an inverted phase-contrast microscope or an inverted differential interference microscope, for example.

Next described with reference to FIG. 6A to FIG. 7B are the fifth embodiment and the sixth embodiment according to the present invention. The fifth and sixth embodiments according to the present invention each provide a condenser lens system which can be used both for liquid immersion and for oil immersion.

Figure 6A:
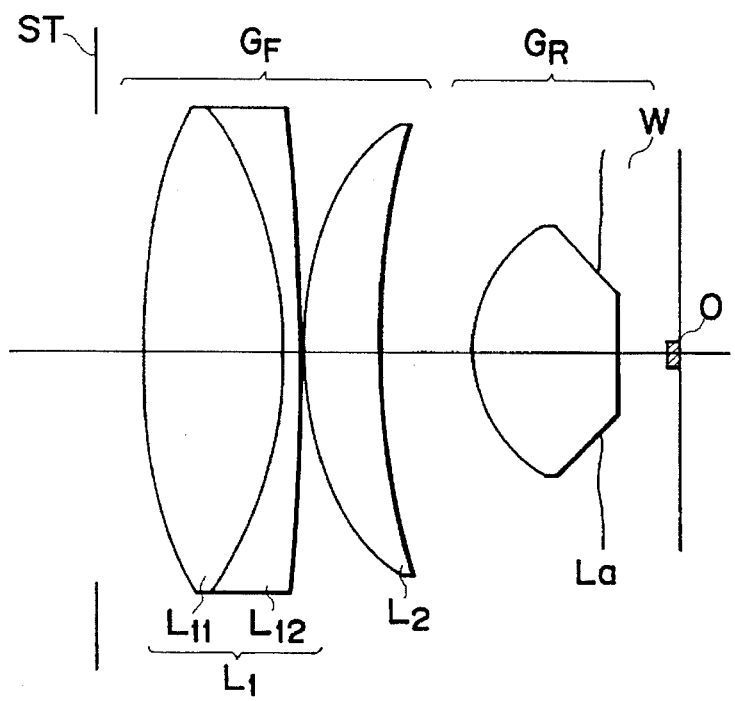
FIG. 6A is a drawing to show a lens arrangement for the fifth embodiment in which a liquid immersion lens $L_a$ is set in a rear group $G_R$.
Figure 6B:
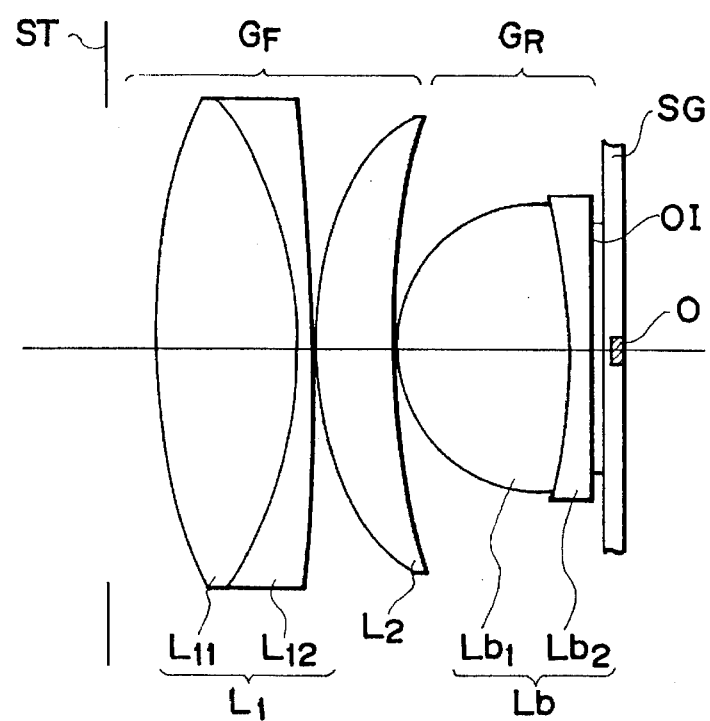
FIG. 6B is a drawing to show a lens arrangement for the fifth embodiment in which an oil immersion lens $L_b$ is set in a rear group $G_R$.
Figure 7A:
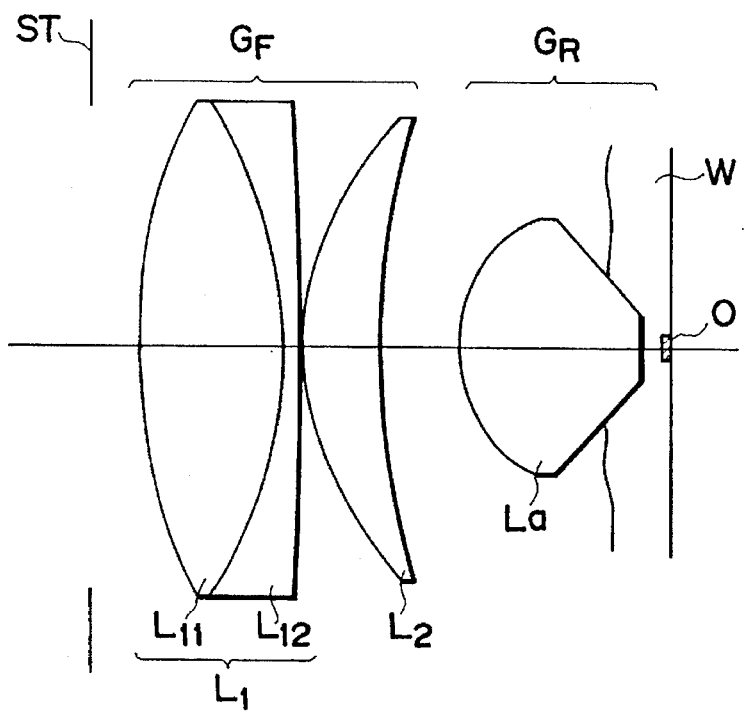
FIG. 7A is a drawing to show a lens arrangement for the sixth embodiment in which a liquid immersion lens $L_a$ is set in a rear group $G_R$.

FIG. 6A shows a lens arrangement in the fifth embodiment in which a liquid immersion lens is set in a rear group, and FIG. 6B shows a lens arrangement in the fifth embodiment in which an oil immersion lens is set in the rear group. Also, FIG. 7A shows a lens arrangement in the sixth embodiment in which a liquid immersion lens $L_a$ is set in a rear group $G_R$, and FIG. 7B a lens arrangement in the sixth embodiment in which an oil immersion lens $L_b$ is set in the rear group $G_R$.

In each of the fifth and sixth embodiments, as shown in FIGS. 6A, 6B and FIGS. 7A, 7B, a condenser lens comprises basically two lens groups, which are a front group $G_F$ of positive refracting power and a rear group $G_R$ of positive refracting power, and the rear group $G_R$ may include either a first lens $L_a$ for liquid immersion and a second lens $L_b$ for oil immersion which are interchangeable with each other.

First, the front group $G_F$ comprises, in the following order from the light source side, a positive compound lens $L_1$ including a positive double convex lens $L_{11}$ and a negative meniscus lens bonded to the positive lens $L_{11}$ and having a convex surface on the sample side, and a positive meniscus lens $L_2$ with a convex surface on the light source side.

When the sample solution is illuminated, a plano-convex lens $L_a$ with a convex surface on the light source side is set as the first lens for liquid immersion in the rear group $G_R$. The plano-convex lens $L_a$ for liquid immersion is made of quartz glass from which no undesirable elements will dissolve into the solution W when immersed therein. Although each embodiment shows a single lens as the first lens for liquid immersion, the first lens may be a compound lens in which two lenses are bonded to each other.

On the other hand, when a sample in oil is illuminated, a plano-convex lens $L_b$ with a convex surface on the light source side is set as the second lens for oil immersion in the rear group $G_R$. The plano-convex lens $L_b$ is a compound lens which includes a positive lens $L_{b1}$ with a stronger-curvature surface on the light source side and a plano-concave lens $L_{b2}$ (negative lens) with a concave surface on the light source side. Although the fifth and sixth embodiments each have the plano-convex lens $L_b$ for liquid immersion as constructed as the compound lens, with no need to be limited thereto, the plano-convex lens $L_b$ may be constructed as a single lens.

The changeover between the plano-convex lens $L_a$ for liquid immersion and the plano-convex lens $L_b$ for oil immersion each to be set in the rear group $G_R$ can be achieved, for example, by a revolver type changeover mechanism in which the plano-convex lens $L_a$ for liquid immersion and the plano-convex lens $L_b$ for oil immersion are set in a revolver and either one of the lenses is set in the rear group $G_R$ by rotating the revolver. An alternative arrangement is such that each of the plano-convex lens $L_a$ for liquid immersion and the plano-convex lens $L_b$ for oil immersion is held by a ring holding member having a threaded portion, the front group $G_F$ is held by a lens barrel having a threaded portion which can mesh with the threaded portion on the ring holding member, and the ring holding member is set to the lens barrel through the threaded portions on both members.

In each embodiment shown in FIGS. 6A, 6B or FIGS. 7A, 7B, the front (light-source-side) focus position of the condenser lens with the first lens $L_a$ for liquid immersion being set in the rear group $G_R$ is arranged to coincide with the front (light-source-side) focus position of the condenser lens with the second lens $L_b$ for oil immersion being set in the rear group $G_R$, and an aperture stop ST is provided at the front (light-source-side) focus position of the condenser lens.

Table 5 and Table 6 as given below list specifications for the fifth and sixth embodiments according to the present invention, respectively. In Table 5 and Table 6, $r_i$ represents a radius of curvature, $d_i$ a distance between lens surfaces, $v_i$ an Abbe's number, $n_i$ an index of refraction for d line ($\lambda$–587 nm), subscript i an order from the light source side, i in subscript ai an order from the light source side in the liquid immersion lens $L_a$, and i in subscript bi an order from the light source side in the oil immersion lens $L_b$. Also, $f_a$ represents a focal length of the total condenser lens system when the liquid immersion lens $L_a$ is set in the rear group $G_R$, $f_b$ a focal length of the total condenser lens system when the oil immersion lens $L_b$ is set in the rear group $G_R$, $NA_a$ a numerical aperture of the sample side of the condenser lens when the liquid immersion lens $L_a$ is set in the rear group $G_R$, $NA_b$ a numerical aperture on the sample side of the condenser lens when the oil immersion lens $L_b$ is set in the rear group $G_R$, $f_F$ a focal length of the front group $G_F$ in the condenser lens, $d_O$ a distance between the aperture stop ST and the first lens surface, $f_{La}$ a focal length of the liquid immersion lens $L_a$, $f_{Lb}$ a focal length of the oil immersion lens $L_b$, $D_a$ an axial distance between the lens surface closest to the sample in the front group and the lens surface closest to the object in the rear group (liquid immersion lens $L_a$), $D_b$ an axial distance between the lens surface closest to the sample in the front group and the lens surface closest to the object in the rear group (oil immersion lens $L_b$), $n_W$ an index of refraction of water, $n_{OI}$ an index of refraction of oil, $v_W$ an Abbe's number of water, $v_{OI}$ an Abbe's number of oil, $d_{SG}$ a thickness of slide glass SG, $n_{SG}$ an index of refraction of the slide glass SG, and $v_{SG}$ an Abbe's number of the slide glass SG.

TABLE 5

Specifications for the arrangement in FIG. 6A (in case the liquid immersion lens $L_a$ is set in the rear group $G_R$) are as follows:
$f_a = 15.0$, $NA_a = 0.9$, $f_F = 27.8$, $d_O = 3.20$, $f_{La} = 19.0$,

| | | | | |
|---|---|---|---|---|
| $r_1 = 39.31$ | $d_1 = 8.30$ | $n_1 = 1.59319$ | $v_1 = 67.9$ | ($L_{11}$) |
| $r_2 = -26.23$ | $d_2 = 1.00$ | $n_2 = 1.86074$ | $v_2 = 23.0$ | ($L_{12}$) |
| $r_3 = -141.00$ | $d_3 = 0.10$ | | | |
| $r_4 = 19.30$ | $d_4 = 4.70$ | $n_3 = 1.77279$ | $v_3 = 49.5$ | ($L_2$) |

TABLE 5-continued

| | | | | |
|---|---|---|---|---|
| $r_5 = 50.50$ | $D_a = 5.70$ | | | |
| $r_{a1} = 8.73$ | $d_a = 8.80$ | $n_a = 1.45847$ | $v_a = 67.7$ | ($L_a$) |
| $r_{a2} = \infty$ | $d_{a2} = 3.65$ | $n_W = 1.33306$ | $v_W = 54.0$ | (W). |

Specifications for the arrangement in FIG. 6B (in case the oil immersion lens $L_b$ is set in the rear group $G_R$) are as follows:
$f_b = 15.0$, $NA_b = 1.35$, $f_F = 27.8$, $d_O = 3.20$, $f_{Lb} = 13.4$

| | | | | |
|---|---|---|---|---|
| $r_1 = 39.31$ | $d_1 = 8.30$ | $n_1 = 1.59319$ | $v_1 = 67.9$ | ($L_{11}$) |
| $r_2 = -26.23$ | $d_2 = 1.00$ | $n_2 = 1.86074$ | $v_2 = 23.0$ | ($L_{12}$) |
| $r_3 = -141.00$ | $d_3 = 0.10$ | | | |
| $r_4 = 19.30$ | $d_4 = 4.70$ | $n_3 = 1.77279$ | $v_3 = 49.5$ | ($L_2$) |
| $r_5 = 50.50$ | $D_b = 0.20$ | | | |
| $r_{b1} = 8.55$ | $d_{b1} = 10.30$ | $n_{b1} = 1.65160$ | $v_{b1} = 58.5$ | ($L_{b1}$) |
| $r_{b2} = -36.78$ | $d_{b2} = 1.20$ | $n_{b2} = 1.74077$ | $v_{b2} = 27.6$ | ($L_{b2}$) |
| $r_{b3} = \infty$ | $d_{b3} = 0.72$ | $n_{OI} = 1.51690$ | $v_{OI} = 43.5$ | (OI) |
| | $d_{SG} = 1.20$ | $n_{SG} = 1.52726$ | $v_{SG} = 55.0$ | (SG) |

$f_{La}/f_F = 0.683$, $f_{Lb}/f_F = 0.482$, $NA_a/NA_b = 0.667$.

TABLE 6

Specifications for the arrangement in FIG. 7A (in case the liquid immersion lens $L_a$ is set in the rear group $G_R$) are as follows:
$f_a = 14.3$, $NA_a = 0.95$, $f_F = 27.7$, $d_O = 3.30$, $f_{La} = 18.0$

| | | | | |
|---|---|---|---|---|
| $r_1 = 34.97$ | $d_1 = 8.30$ | $n_1 = 1.59319$ | $v_1 = 67.9$ | ($L_{11}$) |
| $r_2 = -28.44$ | $d_2 = 1.00$ | $n_2 = 1.86074$ | $v_2 = 23.0$ | ($L_{12}$) |
| $r_3 = -247.00$ | $d_3 = 0.10$ | | | |
| $r_4 = 18.67$ | $d_4 = 4.70$ | $n_3 = 1.77279$ | $v_3 = 49.5$ | ($L_2$) |
| $r_5 = 46.56$ | $D_a = 4.60$ | | | |
| $r_{a1} = 8.23$ | $d_a = 10.80$ | $n_a = 1.45847$ | $v_a = 67.7$ | ($L_a$) |
| $r_{a2} = \infty$ | $d_{a2} = 1.72$ | $n_W = 1.33306$ | $v_W = 54.0$ | (W). |

Figure 7B:
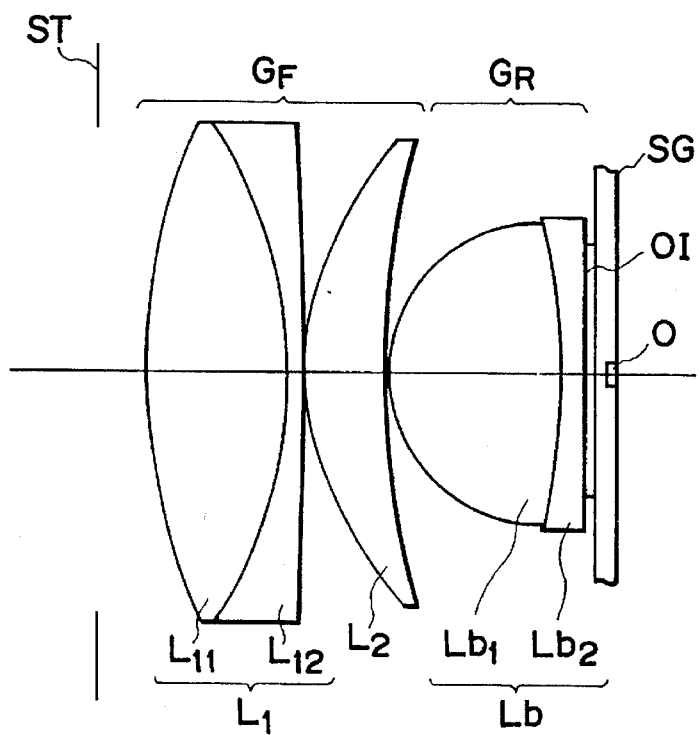
FIG. 7B is a drawing to show a lens arrangement for the sixth embodiment in which an oil immersion lens $L_b$ is set in a rear group $G_R$.

Specifications for the arrangement in FIG. 7B (in case the oil immersion lens $L_b$ is set in the rear group $G_R$) are as follows:
$f_b = 10.5$, $NA_b = 1.35$, $f_F = 27.7$, $d_O = 3.30$, $f_{Lb} = 13.2$

| | | | | |
|---|---|---|---|---|
| $r_1 = 34.97$ | $d_1 = 8.30$ | $n_1 = 1.59319$ | $v_1 = 67.9$ | ($L_{11}$) |
| $r_2 = -28.44$ | $d_2 = 1.00$ | $n_2 = 1.86074$ | $v_2 = 23.0$ | ($L_{12}$) |
| $r_3 = -247.00$ | $d_3 = 0.10$ | | | |
| $r_4 = 18.67$ | $d_4 = 4.70$ | $n_3 = 1.77279$ | $v_3 = 49.5$ | ($L_2$) |
| $r_5 = 46.56$ | $D_b = 0.20$ | | | |
| $r_{b1} = 8.43$ | $d_{b1} = 10.30$ | $n_{b1} = 1.65160$ | $v_{b1} = 58.5$ | ($L_{b1}$) |
| $r_{b2} = -36.74$ | $d_{b2} = 1.20$ | $n_{b2} = 1.75520$ | $v_{b2} = 27.6$ | ($L_{b2}$) |
| $r_{b3} = \infty$ | $d_{b3} = 0.52$ | $n_{OI} = 1.51690$ | $v_{OI} = 43.5$ | |
| | $d_{SG} = 1.20$ | $n_{SG} = 1.52726$ | $v_{SG} = 55.0$ | (SG) |

$f_{La}/f_F = 0.650$, $f_{Lb}/f_F = 0.477$, $NA_a/NA_b = 0.704$.

As described above, the fifth and sixth embodiments according to the present invention can achieve the condenser lenses having satisfactory performance in which the lens closest to the sample is either of the liquid immersion lens and the oil immersion lens interchangeable with each other. Then, in the fifth or sixth embodiment, the condenser lens can well illuminate a sample under a large numerical aperture in either setting for liquid immersion or for oil immersion. The embodiments can utilize the full performance of the objective lens without preparing a plurality of condenser lens systems. The cost reduction is thus possible for the condenser lens system.

Figure 8:
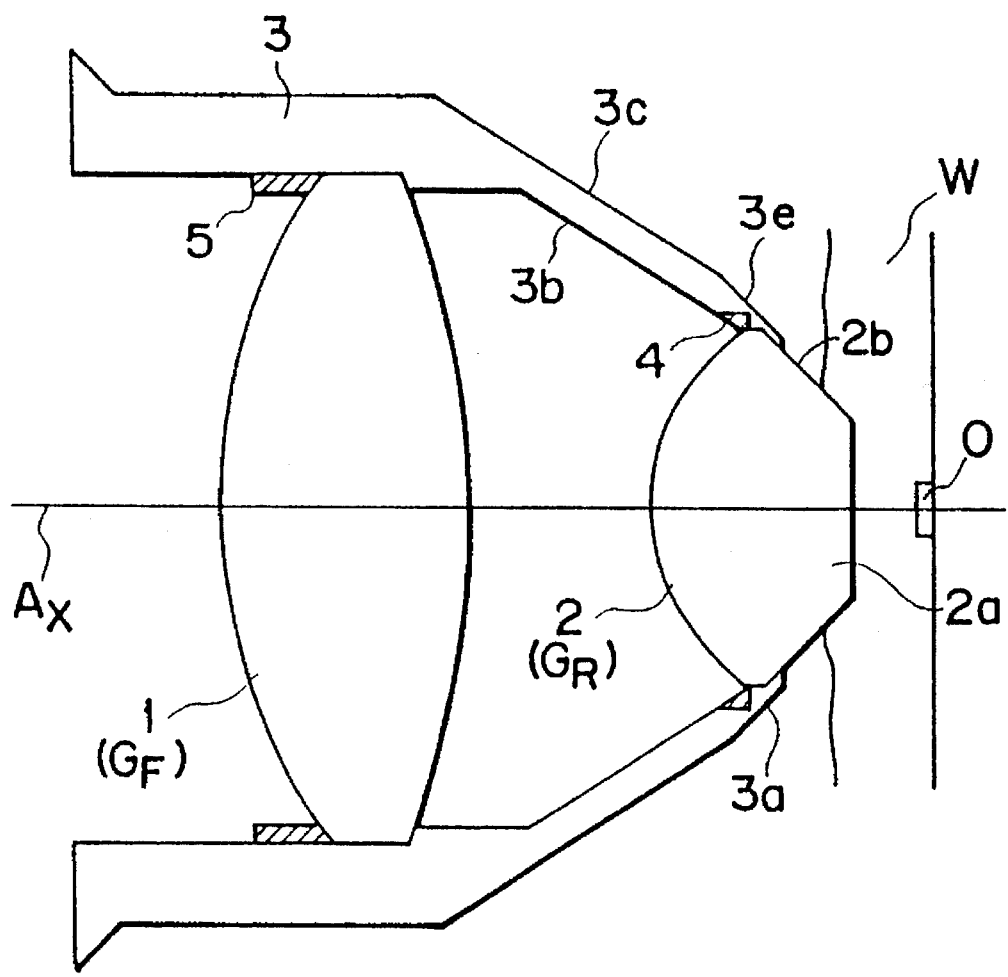
FIG. 8 is a drawing to show the structure of the seventh embodiment of the condenser lens.
Figure 9A:
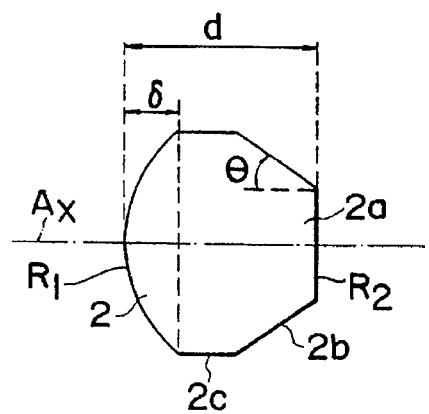
FIG. 9A is a drawing to show the structure of a lens located closest to a sample in the seventh embodiment of the condenser lens.
Figure 9B:
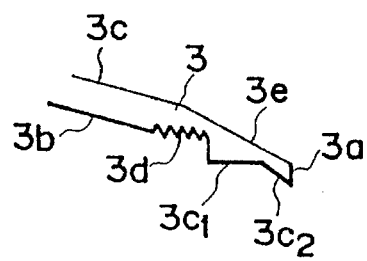
FIG. 9B is a drawing to show the structure of the tip portion of a lens barrel.
Figure 9B:
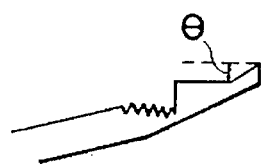
Figure 9C:
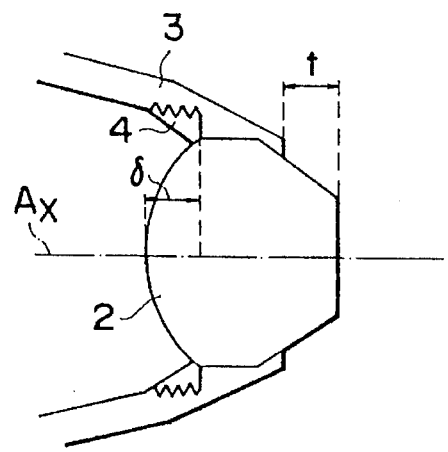
FIG. 9C is a drawing to show a state that the lens shown in FIG. 9A is set in the lens barrel shown in FIG. 9B.
Figure 10:
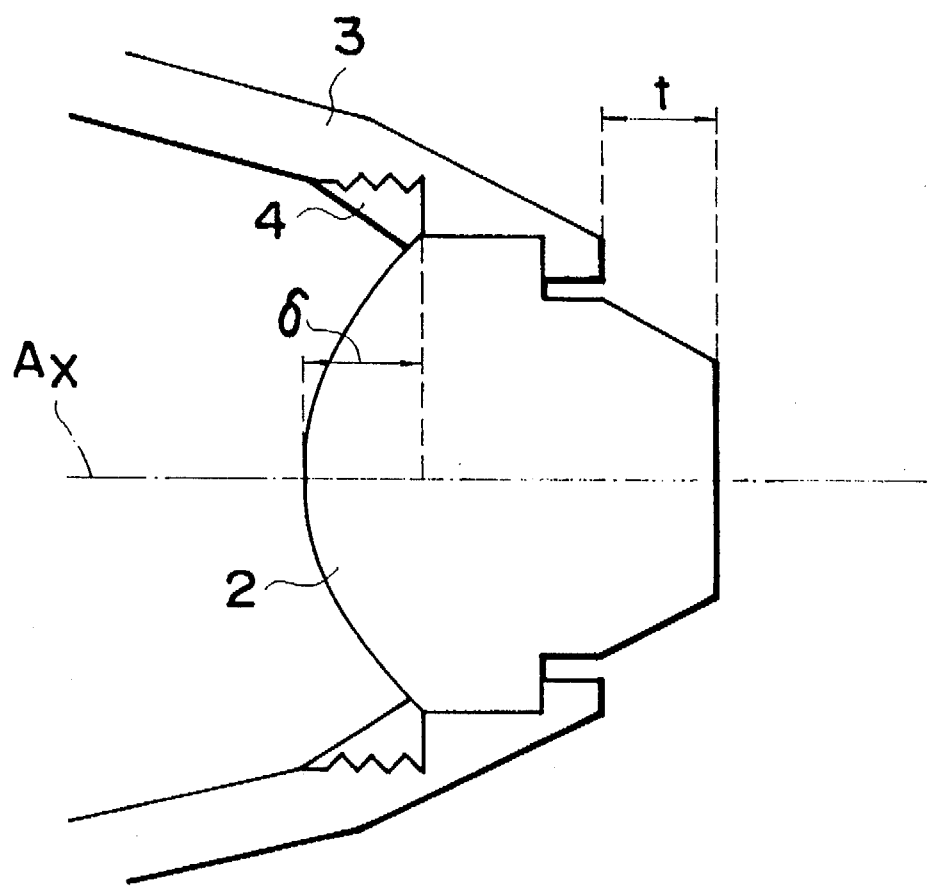
FIG. 10 is a drawing to show the structure of a modification of the seventh embodiment of the condenser lens.

The seventh embodiment according to the present invention is next described referring to FIG. 8 to FIG. 10.

FIG. 8 is a cross section showing the structure of a condenser lens system in the seventh embodiment according to the present invention. The seventh embodiment of the present invention is now described referring to FIG. 8.

As shown in FIG. 8, the condenser lens of the present embodiment comprises, in the following order from the light source side, a lens system including a double convex lens 1 (front group $G_F$ of positive refracting power) and a plano-convex lens 2 (rear group $G_R$ of positive refracting power)

with a flat plane on the sample O side, and a lens barrel 3 holding the lens system. Each lens is fixed by a ring fixing member 4, 5, and the plano-convex lens 2 closest to the sample O is held by the lens barrel 3 such that the lens 2 projects from the tip end 3a of the lens barrel 3. Upon illuminating a sample O in solution W in a laboratory dish, a part of a projecting portion of the plano-convex lens 2 is kept immersed in the solution W, as shown in FIG. 8. In that state, light from an unrepresented illumination light source is guided through the double convex lens 1 and the plano-convex lens 2 to be converged on the sample O in solution W and thereby illuminates the sample O.

Suppose the plano-convex lens 2 is made, for example, of a usual optical material containing heavy metals. Then, when the condenser lens is used in the state that a part of the plano-convex lens 2 is immersed in solution W, elements of heavy metals in the optical material dissolve into the solution W so as to contaminate the solution W. When a sample of an organism is observed in an alive state through the microscope, such contamination will negatively affect the sample O of the organism. Therefore, the plano-convex lens 2, a part of which is to be immersed in solution W, is made of quartz glass (glass having an index of refraction $n_d$ of 1.45847 for d line (587 nm)) from which no undesirable elements will dissolve into solution W when immersed therein.

In the present embodiment, a taper portion 2b is formed on the projecting portion 2a of the plano-convex lens 2 projecting from the lens barrel 3, and a taper portion 3e is formed near the tip end 3a of the lens barrel 3. The taper portion 3e has an inclination substantially equal to that of the taper portion 2b. The taper arrangement facilitates the so-called manipulation to manipulate a sample O by a slender glass tube in an inclined state while observing it through the microscope.

FIG. 8 shows an example of the plano-convex lens 2 as a single lens, but the plano-convex lens 2 may be a compound lens with no need to be restricted to the single lens. Also, the double convex lens 1 may be constructed of a plurality of lenses.

In order to investigate a limit of the projection amount of the plano-convex lens 2 closest to the sample O and holding amount of the lens barrel 3, the inventors first made on an experimental basis nine types of plano-convex lenses 2 made of quartz glass, different in radius of curvature $R_1$ of the light-source-side surface and in axial thickness d, and nine types of brass lens barrels 3 in length of 50 mm which could fit the respective plano-convex lenses 2.

Each of the nine plano-convex lenses 2 was formed as shown in FIG. 9A such that a peripheral surface 2c extends 1 mm along the optical axis in parallel therewith from a position spaced apart by a predetermined distance 6 (which is an axial distance to the light-source-side lens surface) along the optical axis from the vertex of the light-source-side lens surface. A taper portion 2b was formed at an inclination of 30° to the optical axis between the peripheral surface 2c and the sample-side lens surface (flat surface) $R_2$ of each plano-convex lens 2.

Also, each lens barrel 3 for holding a corresponding lens out of the nine plano-convex lenses 2 in a projecting state was formed as shown in FIG. 9B such that the inside surface 3b had a peripheral surface holding portion $3c_1$ for holding the peripheral surface 2c of plano-convex lens 2, formed in length of 1 mm along the optical axis, and a taper surface holding portion $3c_2$ for holding the taper surface 2b of plano-convex lens 2, formed in length of 1 mm along the optical axis. Further, a threaded portion 3d for fixing a ring fixing member 4 as described below was formed inside the peripheral surface holding portion $3c_1$ on the inside surface 3b of each lens barrel 3. Also, a taper portion 3e was formed at an inclination of 30° relative to the optical axis of plano-convex lens 2 near the external tip end of each lens barrel 3, similarly as the taper potion of plano-convex lens 2.

Such nine types of plano-convex lenses 2 and lens barrels 3 shown in FIG. 9A and FIG. 9B were coupled with each other by bonding each plano-convex lens 2 to a corresponding lens barrel 3 with a silicone adhesive, as shown in FIG. 9C. Then the ring fixing member 4 with a threaded portion 4a formed on its circumference was brought into a meshing state with the threaded portion 3d of the lens barrel 3 to fix the plano-convex lens 21, whereby nine types of experimental condenser lenses were produced.

Simple tests were conducted to check a limit of the projection amount of the plano-convex lens 2 and holding amount of the lens barrel 3. In the tests, the nine experimental condenser lenses were dropped from a position of 200 mm above a rubber mat of thickness 10 mm in the state that the projecting portion of the lens was directed vertically downward.

Table 7 shows test results for the nine types of experimental condenser lenses. In Table 7, t represents a length along the optical axis between the illuminated-object-side surface $R_2$ of the plano-convex lens 2 and the tip end of the lens barrel 3 (projection amount of plano-convex lens). In the results, O (acceptable) represents a combination which showed no deviation of the optical axis Ax of the plano-convex lens 2 after the drop test and x (unacceptable) a combination which showed a deviation of the optical axis Ax of the plano-convex lens 2 after the drop test. The following Equation (A) defines a holding rate H at which the lens barrel 3 holds the plano-convex lens 2. Table 1 also shows the holding rate H for each example.

TABLE 7

|  | R. of C. |  | Ax. T. | Ax. Dis. of $R_2$ | Proj. | Hold |  |
|---|---|---|---|---|---|---|---|
|  | $R_1$ (mm) | $R_2$ (mm) | d (mm) | δ (mm) | t (mm) | rate H | Res. |
| Ex. 1 | 25 | ∞ | 15 | 5.5 | 7.5 | 0.79 | o |
| Ex. 2 | 25 | ∞ | 22.5 | 4.5 | 16.0 | 0.89 | o |
| Ex. 3 | 25 | ∞ | 24.5 | 4.0 | 18.5 | 0.90 | x |
| Ex. 4 | 30 | ∞ | 20.0 | 3.5 | 13.5 | 0.82 | o |
| Ex. 5 | 30 | ∞ | 25.0 | 3.5 | 18.0 | 0.84 | o |
| Ex. 6 | 30 | ∞ | 25.5 | 3.2 | 20.3 | 0.91 | x |
| Ex. 7 | 45 | ∞ | 23.0 | 3.5 | 17.5 | 0.90 | o |
| Ex. 8 | 45 | ∞ | 24.0 | 3.0 | 19.0 | 0.90 | x |
| Ex. 9 | 45 | ∞ | 25.5 | 3.5 | 20.0 | 0.91 | x |

As seen from Table 7, a limit of projection amount t of the plano-convex lens 2 and holding amount of plano-convex lens $L_2$ seems to be at the holding rate H of about 0.9. Therefore, it can be understood that the following condition should be preferably satisfied in order to bear the impact upon a drop of the condenser lens.

$$t/(d-\delta) < 0.9 \qquad (B)$$

In the condition, t represents a length along the optical axis between the illuminated-object-side lens surface $R_2$ of the plano-convex lens 2 and the tip end 3a of the lens barrel 3, d an axial thickness of the plano-convex lens 2, and δ a distance along the optical axis between the position where the inner surface 3b of the lens barrel 3 comes into contact with the peripheral portion of the plano-convex lens 2 and a tangent plane to the vertex of the light-source-side lens surface $R_1$ of the plano-convex lens 2.

The structure of the condenser lens as shown in FIG. 9C may be replaced by another structure of the condenser lens, for example, as shown in FIG. 10. Also, although the limit value of holding rate H can be slightly improved above 0.9 by increasing the contact area of the peripheral portion of the plano-convex lens 2 with the lens barrel 3 in a modified shape, the range of the above condition (B) is preferably satisfied in practical applications.

If the projection amount of the plano-convex lens 2 is reduced, the contact area between the peripheral portion of the plano-convex lens 2 and the holding portion of lens barrel 3 naturally increases so as to decrease the holding rate H, so that the lens barrel 3 can hold the plano-convex lens 2 in a stabler state.

It should be, however, noted that the condenser lens according to the present invention is used in such a state that the sample-side lens surface of the plano-convex lens 2 closest to the sample is immersed in solution and that the adhesive between the plano-convex lens 2 and the lens barrel 3 could be immersed in solution unless a certain projection amount of the plano-convex lens 2 is assured, which could cause contamination of solution by undesirable elements dissolving from the adhesive. Such contamination of solution by undesirable elements in the adhesive rarely occurs in case the solution is brought into a little contact with the adhesive between the lens barrel 3 and the plano-convex lens 2 by the surface tension. Considering the surface tensions of various solutions in which a sample could be dipped, the following Equation (C) is preferably satisfied by the length t along the optical axis between the illuminated-object-side lens surface of the plano-convex lens 2 and the tip end 3a of lens barrel 3.

$$t > 2 \text{ mm} \tag{C}$$

Since there is a possibility that the solution culturing the sample enters the lens barrel due to the surface tension to corrode the inside of the lens barrel 3, at least the sample-side portion (taper portion 3e) of the lens barrel 3 is preferably made of a material resistant to corrosion, such as stainless steel.

Incidentally, the condenser lens according to the present invention is so arranged that the taper portion 2b is formed near the projecting portion 2a of the plano-convex lens 2. In that arrangement, the following Equation (D) is preferably satisfied:

$$\theta > \sin^{-1} (NA/n) \tag{D}$$

where θ is an inclination of the taper portion 2b relative to the optical axis Ax of the plano-convex lens 2, NA a numerical aperture of the total optical system in the condenser lens in solution, and n an index of refraction of the plano-convex lens 2.

Unless this condition (D) is satisfied, the aperture of the sample-side lens surface (flat surface) of the plano-convex lens 2 must be increased, which could result in increasing the size of the condenser lens and, therefore, is not preferable.

It is preferable that the taper portion 3e of the lens barrel 3 is formed at an inclination substantially equal to that of the taper portion 2b of plano-convex lens 2 in order to facilitate the operation such as a manipulation. It is more preferable that the above condition (D) is satisfied in that case.

As described above, the seventh embodiment according to the present invention is free of the illumination unevenness caused by a shake of the liquid surface, a problem of occurrence of a phase difference at the liquid surface due to a shake of liquid surface, and a problem of occurrence of a phase difference due to a manipulation. Therefore, an excellent image of a sample in culture solution can be observed using an inverted phase-contrast microscope or an inverted differential interference microscope to which the condenser lens system of the seventh embodiment according to the present invention is applied. In addition, the condenser lens system is very effective to observe a sample of an organism, because no undesirable elements will dissolve into the solution and therefore the solution is free of contamination.

Particularly, by forming the taper portions on the tip end portion of the lens barrel and the lens closest to the sample, a great advantage can be attained to facilitate the operation such as a manipulation while observing the sample through a microscope.

Also, the condenser lens system in each embodiment as described above permits the sample O in solution W to be illuminated in such a state that the lens surface closest to the sample in the condenser lens system is located closer to the sample than the liquid surface is, whereby the sample can be observed without any influence of shake of the liquid surface. Therefore, the condenser lens system in each embodiment is suitable for the illumination system in the inverted microscope as shown in FIG. 11.

It should be understood that the embodiments as described above were provided only for clarifying the technical concepts of the present invention and the invention should not be interpreted in a narrow sense as limited only to such specific examples. There are various embodiments and modifications of the invention within the spirit of the present invention and the scope of the appended claims.

What is claimed is:

1. A condenser lens system for collecting light from a light source to illuminate a sample, which comprises, in a named order from a light source side to a sample side:

a front group $G_F$ of positive refracting power having at least one lens;

a rear group $G_R$ of positive refracting power having at least a first positive lens for water immersion located closest to the sample, said first positive lens having a flat surface on the sample side; and a second positive lens for oil immersion;

wherein said first positive lens for water immersion has a positive refracting power, a convex surface on the light source side and is arranged to be interchangeable with said second positive lens for oil immersion.

2. The condenser lens system according to claim 1, wherein the lens system satisfies the following conditions:

$$0.4 < f_{LL}/f_F < f_{La}/f_F < 0.7,$$

$$0.6 < NA_a/NA_b < 1,$$

where $f_F$ is a focal length of said front group $G_F$, $f_{La}$ is a focal length of said first positive lens for water immersion, $f_{Lb}$ is a focal length of said second positive lens for oil immersion, $NA_a$ is a numerical aperture of the condenser lens system when said first positive lens for water immersion is set in said condenser lens system, and $NA_b$ is a numerical aperture of the condenser lens system when said second positive lens for oil immersion is set in said condenser lens system.

3. The condenser lens system according to claim 1, wherein said first positive lens for water immersion is a plano-convex lens.

4. The condenser lens system according to claim 1, wherein said second positive lens for oil immersion comprises a compound lens in which a positive lens and a negative lens are bonded to each other.

5. The condenser lens system according to claim 1, wherein said front group $G_F$ comprises, in a named order from the light source side to the sample side:

a positive double convex lens;

a negative meniscus lens bonded to said positive double convex lens and having a convex surface on the sample side; and a positive meniscus lens having a convex surface on the light source side.

6. The condenser lens system according to claim 1, wherein the lens system satisfies the following condition:

$0 < D_b/D_a < 0.4$, where $D_a$ is an axial distance between a lens surface closest to the sample in said front group $G_F$ and a lens surface closest to the light source in said first positive lens for water immersion, and $D_b$ is an axial distance between the lens surface closest to the sample in said front group $G_F$ and the lens surface closest to the light source in said second positive lens for oil immersion.

7. The condenser lens system according to claim 1, wherein said first positive lens for water immersion has a taper portion tapered toward the sample.

8. The condenser lens system according to claim 1, wherein said condenser lens system has a first front focus position, when said first positive lens for water immersion is set in said condenser lens system, which is substantially coincident with a second front focus position of said condenser lens system when said second positive lens for oil immersion is set in said condenser lens system.

9. The condenser lens system according to claim 1, further comprising a revolver, wherein said first positive lens for water immersion and said second positive lens for oil immersion are set in said revolver.

10. The condenser lens system according to claim 1 further comprising:

a lens barrel for holding said front group $G_F$; and first and second holding members, connected to an inside portion of said lens barrel, for respectively holding said first positive lens for water immersion and said second positive lens for oil immersion.

11. The condenser lens system according to claim 10, wherein:

said lens barrel has a threaded portion; and each of said first and second holding members has a threaded portion which is engageable with said threaded portion of said lens barrel.

12. The condenser lens system according to claim 1, further comprising a lens barrel for holding said first positive lens for water immersion, wherein said first positive lens for water immersion projects from said lens barrel.

13. The condenser lens system according to claim 12, wherein said first positive lens for water immersion has a taper portion tapered toward the sample.

14. A condenser lens system for collecting light from a light source to illuminate a sample, which comprises, in a named order from a light source side to a sample side:

a front group $G_F$ of positive refracting power having at least one lens; and a rear group $G_R$ of positive refracting power having at least a first positive lens for water immersion located closest to the sample, said first positive lens having a flat surface on the sample side;

wherein the condenser lens system satisfies the following conditions:

$0.4 < d_{La}/f < 1$, $0.22 < d_{La}/L < 0.6$, $0.1 < d_W/f < 0.7$, $0.6 < f_{La}/f_F < 1$, where f is a focal length of the total condenser lens system, $d_{La}$ is an axial thickness of said first positive lens for water immersion, L is an axial distance between a lens surface closest to the light source in said front group and a lens surface closest to the sample in said rear group, $d_W$ is a distance between said first positive lens for water immersion and a surface of the sample, $f_{La}$ is a focal length of said first positive lens for water immersion, and $f_F$ is a focal length of said front group $G_F$.

15. The condenser lens system according to claim 14, further comprising an optical material forming the surface closest to the sample in said first positive lens $L_a$ for water immersion, wherein the following condition is satisfied:

$n_a < 1.5$, where $n_a$ is an index of refraction of said optical material.

16. A microscope apparatus comprising:

a light source; and a condenser lens system for collecting light from said light source to illuminate a sample;

wherein said condenser lens system comprises in a named order from a light source side to a sample side a front group $G_F$ of positive refracting power having at least one lens;

a rear group $G_R$ of positive refracting power having at least a first positive lens for water immersion located closest to the sample, said first positive lens having a flat surface on the sample side; and a second positive lens for oil immersion, wherein said first positive lens for water immersion has a positive refracting power, a convex surface on the light source side, and is arranged to be interchangeable with said second positive lens for oil immersion.

17. A microscope apparatus according to claim 16, further comprising:

a lens barrel for holding said first positive lens for water immersion, wherein said first positive lens projects from said lens barrel.

18. A microscope apparatus comprising:

a light source; and a condenser lens system for collecting light from said light source to illuminate a sample;

wherein said condenser lens system comprises in a named order from a light source side to a sample side a front group $G_F$ of positive refracting power having at least one lens; and a rear group $G_R$ of positive refracting power having at least a first positive lens for water immersion located closest to the sample, said first positive lens having a flat surface on the sample side;

wherein the condenser lens system satisfies the following conditions:

$0.4 < d_{La}/f < 1$, $0.22 < d_{La}/L < 0.6$, $0.1 < d_W/f < 0.7$, $0.6 < f_{La}/f_F < 1$, where f is a focal length of the total condenser lens system, $d_{La}$ is an axial thickness of said first positive lens for water immersion, L is an axial distance between a lens surface closest to the light source in said front group and a lens surface closest to the sample in said rear group, $d_W$ is a distance between said first positive lens for water immersion and a surface of the sample, $f_{La}$ is a focal length of said first positive lens for water immersion, and $f_F$ is a focal length of said front group $G_F$.

* * * * *

UNITED STATES PATENT AND TRADEMARK OFFICE
CERTIFICATE OF CORRECTION

PATENT NO. : 5,657,166
DATED : August 12, 1997
INVENTOR(S) : Tatsuro OTAKI et al.

It is certified that error appears in the above-identified patent and that said Letters Patent is hereby corrected as shown below:

In the claims, change < to "≤" throughout all of claims 2, 6, 14, 15 and 18.

Column 17, line 40, after "1" insert --,--.

Signed and Sealed this

Fourteenth Day of April, 1998

Attest:

BRUCE LEHMAN

Attesting Officer

Commissioner of Patents and Trademarks